(12) United States Patent
Castiglioni et al.

(10) Patent No.: US 7,927,531 B2
(45) Date of Patent: Apr. 19, 2011

(54) METHOD AND EXTRUSION HEAD FOR EXTRUDING A POLYMERIC MATERIAL

(75) Inventors: Valter Castiglioni, Magenta (IT);
Angelo Riella, Pozzolo Formigaro (IT);
Sergio Belli, Leghorn (IT); Luca Balconi, Bresso (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 1370 days.

(21) Appl. No.: 10/499,201

(22) PCT Filed: Dec. 21, 2001

(86) PCT No.: PCT/IT01/00653
§ 371 (c)(1),
(2), (4) Date: Jan. 5, 2005

(87) PCT Pub. No.: WO03/061944
PCT Pub. Date: Jul. 31, 2003

(65) Prior Publication Data
US 2005/0104246 A1    May 19, 2005

(51) Int. Cl.
*B29C 47/00*    (2006.01)
(52) U.S. Cl. ................................... 264/176.1

(58) Field of Classification Search ............... 264/176.1; 425/113, 466, 380
See application file for complete search history.

(56) References Cited

U.S. PATENT DOCUMENTS

| | | | |
|---|---|---|---|
| 3,229,012 A | 1/1966 | Garner | |
| 3,530,916 A | 9/1970 | Williams | |
| 5,690,971 A * | 11/1997 | Buluschek | 425/113 |
| 2001/0010828 A1 | 8/2001 | Beckmann et al. | |
| 2006/0182831 A1 * | 8/2006 | Balconi et al. | 425/113 |

* cited by examiner

*Primary Examiner* — Christina Johnson
*Assistant Examiner* — Larry Thrower
(74) *Attorney, Agent, or Firm* — Finnegan, Henderson, Farabow, Garrett & Dunner, L.L.P.

(57) ABSTRACT

An extrusion method and head for depositing by extrusion a polymeric material intended, in particular, for the production of cables includes a core and a coating layer arranged at a radially outer position with respect of the core. The method includes the steps of feeding the polymeric material in a feeding duct of the extrusion head and of conveying a part of the polymeric material towards an undercut extending in the extrusion head in proximity of an end of the feeding duct. The method provides a sealing force between a head body and a conveyor element of the extrusion head exerted by means of the pushing action exerted by the polymeric material in the undercut in a direction substantially perpendicular to the longitudinal axis of the head body.

6 Claims, 3 Drawing Sheets

METHOD AND EXTRUSION HEAD FOR EXTRUDING A POLYMERIC MATERIAL

CROSS REFERENCE TO RELATED APPLICATION

This application is a national phase application based on PCT/IT01/00653, filed Dec. 21, 2001, the content of which is incorporated herein by reference.

FIELD OF THE INVENTION

In a first aspect thereof, the present invention concerns a method for extruding a polymeric material by means of an extrusion head.

The present invention also concerns an extrusion head for extruding a polymeric material as well as a conveyor element and a head body making part of said extrusion head.

Moreover, the present invention concerns an extrusion apparatus comprising said extrusion head.

For illustrative purposes, a possible field of application of the present invention is that of the production of cables including at least one transmissive element and at least one coating layer arranged at a radially outer position with respect of said transmissive element. More precisely, the present invention may advantageously be applied to unipolar or multipolar cables of the electric type for transporting or distributing energy, or of the optical type or of the mixed energy/telecommunications type.

PRIOR ART

A cable generally comprises at least one transmissive element (electrical, optical or electro-optical) and at least one coating layer made of polymeric material arranged at a radially outer position with respect of said transmissive element.

The polymeric material of said coating layer is selected so as to provide the latter with semiconductive properties, electrical insulation or mechanical protection properties depending on the type of cable under consideration and of the position of said layer within said cable.

In order to manufacture a coating layer made of polymeric material, the prior art provides for the use of an extrusion head comprising:

a) a head body provided with an inner cavity coaxially extending with a longitudinal axis of the head body; and
b) at least one conveyor element mounted in the inner cavity of the head body about said longitudinal axis, the conveyor element including:
b1) a tubular body provided with an inner cavity coaxially extending with the longitudinal axis of the head body; and
b2) at least one distribution channel formed on the outer surface of the tubular body and defining an upstream portion and a downstream portion of the tubular body.

In greater detail, during the production process of a cable, the inner cavity of the conveyor element is intended for receiving the semi-finished cable produced up to this point and upon which a coating layer of polymeric material is to be deposited by extrusion, whereas the distribution channel is intended for distributing said polymeric material on the outer surface of the conveyor element arranged downstream of the distribution channel.

The extrusion heads of the prior art comprise, moreover, a feeding duct of the polymeric material formed in the head body and a lamination duct defined between the head body and the conveyor element.

The conveyor element, therefore, carries out the function of circumferentially distributing in a uniform manner the polymeric material intended for forming the coating layer of the cable into the lamination channel.

However, in the extrusion heads of the prior art the Applicant has noted an inadequate seal between the conveyor element and the head body upstream of the distribution channel, with consequent possible leakages of the polymeric material in said zone of the extrusion head.

Regarding this, it can be emphasized that any possible leakages of the polymeric material towards the zone of the extrusion head arranged upstream of the distribution channel cause stagnations of the polymeric material which, also due to the effect of the temperature (for example due to a partial cross-linking), may cause the formation of clots of said polymeric material.

Once formed, said clots may detach from the leakage zone and may flow in the inlet mixture flow moving towards the lamination channel.

The presence of said clots, which constitute a dishomogeneity in the coating layer of the cable being produced, not only negatively affects the aesthetic effect of the cable but, depending on the type of coating being deposited, may also negatively affect the properties of the cable.

For example, if the coating layer being produced is the electrical insulation layer, the occurring of any leakages during the deposition of the latter and the formation of clots in the electrical insulation layer may cause a deterioration of the electrical insulation properties of the cable, said drawback being particularly undesired above all in the case of cables for transporting or distributing high and extra high voltage electrical energy.

In the present description, the term "low voltage" indicates a voltage lower than about 1 kV, the term "medium voltage" indicates a voltage of between about 1 kV and about 30 kV, the term "high voltage" indicates a voltage of between about 30 kV and about 220 kV, whereas the term "extra high voltage" indicates a voltage greater than about 220 kV.

In order to avoid or at least reduce said leakages, some technical solutions are known which are only partly suitable for the purpose and which, in general, involve a plurality of drawbacks essentially connected to an increased complexity of mounting the conveyor in the head body and/or to problems of stagnation of the polymeric material.

For example, extrusion heads are known comprising a head body the radially inner surface of which is provided with a profile of the substantially conical type are known. Said structure involves the need to operate with particularly close constructive tolerances during the production steps and, at the same time, involves the need to operate with the maximum precision also during the assembly steps.

Moreover, said embodiment is particularly effective above all with flows of polymeric material fed at a low pressure and causes an increase in the assembly complexity, in the assembly time and in the production costs.

Extrusion heads are also known which provide for the use of a sealing gasket (for example an O-ring) in the coupling zone between the head body and the conveyor.

However, said solution determines the formation of undesired stagnation zones of the polymeric material with the consequent need to make frequent interventions to clean the extrusion head, as well as to replace the sealing gasket.

SUMMARY OF THE INVENTION

In order to overcome the drawbacks of the prior art described above, the Applicant has perceived the need to provide a method for depositing by extrusion a coating layer of polymeric material by means of an extrusion head capable of avoiding any undesired leakages of said material, while ensuring simplicity and rapidity of assembly.

The Applicant has found that it is possible to accomplish an effective seal between the conveyor element and the head body of an extrusion head by exploiting the pushing action which is exerted by the polymeric material fed in the corresponding feeding duct.

The Applicant has found that it is possible to exploit the pressure of the polymeric material entering an extrusion head by shaping the latter in a suitable manner in proximity of the axially inner end of the feeding duct of the polymeric material obtained in said extrusion head.

Therefore, in accordance with a first aspect thereof, the present invention refers to a method for depositing by extrusion a coating layer of polymeric material by means of an extrusion head comprising a head body and at least one conveyor element coaxially mounted with said head body about a common axis, said head body comprising at least one feeding duct for feeding said polymeric material in a lamination channel defined between said head body and said conveyor element, said method comprising the steps of:

a) feeding said polymeric material in said feeding duct;
b) conveying a part of said polymeric material towards at least one undercut arranged in proximity of an end of said feeding duct, said part of said polymeric material exerting a sealing action between said head body and said at least one conveyor element.

In accordance with the present invention, said sealing action is carried out by said part of said polymeric material by a pushing action exerted in a direction substantially perpendicular to said common axis.

Thanks to the fact that the aforementioned undercut is formed in proximity of an end of the feeding duct at the interface between the head body and the conveyor element, i.e. where there is the greatest pressure of the flow of the polymeric material entering the extrusion head, the method of the invention advantageously allows to obtain an effective sealing action against any possible leakages of the polymeric material.

Moreover, the method according to the present invention can advantageously be carried out without modifying the conventional geometry of the mounting surfaces of the head body and of the conveyor element. In such a way, it is possible to ensure a constructive simplicity both of the conveyor element and of the head body, as well as an assembly simplicity of the conveyor element in the head body.

In accordance with a first preferred embodiment of the method according to the invention, the aforementioned undercut is formed in at least one distribution channel (also called compensation channel) formed on the outer surface of the conveyor element and the sealing action of said method is exerted by the entering polymeric material which exerts a pushing action of the conveyor element against the head body thus avoiding, or at least minimising, the risk of leakages between the head body and the conveyor element.

Said operating method can be carried out also due to the fact that the polymeric material is generally fed under pressure, said pressure being imparted by the extrusion screw arranged upstream of the feeding duct of the polymeric material and depending also on the physical-chemical properties (for example the viscosity) of the polymeric material. It can, indeed, be emphasized that the sealing action according to the method of the present invention is particularly effective above all if the entering polymeric material is fed at high pressure so that said material can exert said pushing action. On the contrary, if the entering polymeric material is fed at low pressure or is in a transient condition (for example at the beginning or at the end of the feeding step of the polymeric material to the extrusion head), the aforementioned sealing action is advantageously and sufficiently ensured by the interference between the head body and the conveyor element.

In accordance with said first preferred embodiment, said sealing action is accomplished by pushing an elastically deformable, substantially lip-shaped, sealing element which is integrally formed with said conveyor element and which extends in a direction substantially parallel to said common axis. In accordance with said first preferred embodiment, an elastically deformable lip defined between the aforementioned undercut and the radially outer surface of the conveyor element is formed in the conveyor element. Therefore, the seal between the head body and the conveyor element is accomplished thanks to the pressure exerted by the polymeric material against said lip, said pressure elastically deforming the lip in the direction of the head body and thus attaining the desired sealing action.

In accordance with a second preferred embodiment of the method of the invention, the aforementioned undercut is formed in the feeding duct of the head body and the aforementioned sealing action is carried out by the entering polymeric material which exerts a pushing action of the head body against the conveyor element nullifying, or at least substantially reducing, the risk of leakages between the conveyor element and the head body.

In accordance with said second preferred embodiment of the method according to the invention, the sealing action is carried out by the entering polymeric material which exerts a pushing action upon an elastically deformable, substantially lip-shaped, sealing element which is integrally formed with the head body and which extends in a direction substantially parallel to said common axis. In accordance with said second embodiment, said lip is advantageously capable of performing the seal between the head body and the conveyor element when the lip is moved by the pushing action exerted against the latter by the entering polymeric material.

In a second aspect thereof, the present invention refers to an extrusion head for extruding a polymeric material comprising:

a) a head body provided with an inner cavity coaxially extending with a longitudinal axis of said head body; and
b) at least one conveyor element mounted within said inner cavity of the head body about said longitudinal axis, said conveyor element including:
b1) a tubular body provided with an inner cavity coaxially extending with said longitudinal axis;
b2) at least one distribution channel formed on the outer surface of said tubular body and defining an upstream portion and a downstream portion of said tubular body;
characterized in that said distribution channel is provided with at least one undercut axially extending in said upstream portion of said tubular body.

Preferably, said at least one undercut axially extends in said upstream portion of said tubular body along a direction substantially parallel to said longitudinal axis.

Advantageously, said first embodiment of the extrusion head of the invention accomplishes the seal between the head body and the conveyor element thanks to the particular configuration of the distribution channel and to the pushing action exerted by the polymeric material.

Preferably, the aforementioned undercut has a length (in the axial direction) of between about 3 mm and about 30 mm, preferably of between about 4 mm and about 12 mm.

In such a way, therefore, a seal is ensured at pressures of the polymeric material comprised between about 0 bar and about 1500 bar.

In accordance with a preferred embodiment, the undercut is substantially U-shaped.

Thanks to said a configuration of the undercut, the risk of formation of stagnation zones of the material is advantageously further reduced.

Preferably, the bottom wall of the undercut is substantially perpendicular to the longitudinal axis of the head body.

Preferably, the bottom wall of the undercut is connected to the bottom wall of the distribution channel by means of a curvilinear part. Preferably, said curvilinear connection part has a bending radius comprised between about 0.5 mm and about 15 mm.

Advantageously, the presence of said curvilinear connection part further allows to avoid the formation of stagnation zones of the polymeric material entering the feeding duct.

In accordance with a preferred embodiment of the invention, the undercut defines an elastically deformable sealing element, substantially lip-shaped, positioned in the upstream portion of the tubular body of the conveyor.

According to the aforementioned embodiment, said lip is advantageously capable of accomplishing the seal between the head body and the conveyor element when the lip is pushed against the head body by the pushing action of the polymeric material.

Preferably, the bottom wall of the undercut is connected to the lip by means of a curvilinear part. Preferably said curvilinear connection part has a bending radius comprised between about 0.5 mm and about 15 mm.

Preferably, the curvilinear connection parts between the bottom wall of the under cut and the lip and between the bottom wall of the undercut and the bottom wall of the distribution channel have the same bending radius.

Generally, the conveyor comprises at least one pair of distribution channels which begin at the feeding duct formed in the head body and respectively extend on opposite sides along the outer surface of the conveyor so as to concern the whole circumferential development of said conveyor and to distribute the polymeric material, entering from said feeding duct, onto the outer surface of the conveyor (also known as lamination zone).

Preferably, each distribution channel of the conveyor has a substantially helical development.

Preferably, each distribution channel is tapered, i.e. the length (in the axial direction) of the bottom wall of said channel decreases along the development thereof in the circumferential direction. More precisely, the length of said bottom wall (without considering the length of the aforementioned undercut) is greater at the feeding duct and gradually decreases as the distribution channel heads into the lamination channel.

Moreover, preferably also the depth (measured in the radial direction) of the distribution channel decreases passing from the portion of said distribution channel arranged in proximity of the end of the feeding duct of the elastomeric material towards the portion of said distribution channel arranged in proximity of the lamination channel.

Said constructive solutions allow the maximum flow rate of the entering polymeric material to be received at the portions of the distribution channels with a greater length (in the axial direction) and with a greater depth (in the radial direction), and thus with a greater volume capacity.

Moreover, preferably the aforementioned undercut has a length (measured in the axial direction) progressively decreasing along the circumferential development of the distribution channel. More precisely, advantageously said undercut, and consequently the aforementioned elastically deformable lip defined by the same, has a maximum length where there is the greatest sealing action, i.e. at the zone of the extrusion head where there is the greatest pressure exerted by the entering polymeric material, i.e. at the feeding duct of the head body.

Preferably, the aforementioned undercut extends only along a portion of predetermined length of the distribution channel. In other words, preferably said undercut is no longer present (i.e. the undercut has a length equal to zero) before the distribution channel heads into the lamination channel.

Preferably, the undercut of the feeding duct has a length equal to zero (i.e. there is no longer the undercut) at the end of the distribution channel in fluid communication with the lamination channel.

Preferably, the head body and the conveyor element are mounted with interference by carrying out one or more heating steps alternated with one or more cooling steps in order to allow the insertion of the conveyor element within the head body.

Said type of assembly ensures a suitable sealing action when the elastomeric material is fed at low pressures (for example in a transient condition), condition in which the lip remains substantially undeformed since the pushing action of the polymeric material is lacking.

Preferably, the extrusion head according to the present invention can advantageously be used in the production processes of cables for transporting or distributing high or extra high voltage energy, in particular for depositing by extrusion coating layers, such as the electrical insulation layer or the inner or outer semiconductive layers of the cable, which require the use of particularly viscous polymeric materials which have to be fed at high pressures, for example comprised between 0 bar and 1500 bar, preferably between 100 bar and 600 bar.

The extrusion head further comprises a lamination channel defined between the conveyor element and the head body downstream of the distribution channel, the lamination channel being in fluid communication with the distribution channel and with an outlet opening formed in the extrusion head.

The extrusion head further comprises a male die and a female die mounted in the head body about the longitudinal axis thereof, downstream of the conveyor element.

In a further embodiment of the invention, the extrusion head further comprises at least one intermediate die mounted in the head body between the male die and the female die.

In accordance with a second embodiment, the present invention concerns an extrusion head for extruding a polymeric material comprising:
  a) a head body including:
    a1) an inner cavity coaxially extending with a longitudinal axis of said head body;
    a2) a feeding duct for feeding said polymeric material in said head body; and
    a3) at least one distribution channel formed on the inner surface of said head body and in fluid communication with said feeding duct, said distribution channel defining an upstream portion and a downstream portion of said head body, and
  b) at least one conveyor element mounted in said inner cavity of said head body about said longitudinal axis, said conveyor element comprising a tubular body provided with an inner cavity coaxially extending with said longitudinal axis, characterized in that said distribution channel is provided with at least one undercut axially extending in said upstream portion of said head body.

Preferably, said at least one undercut axially extends in said upstream portion of said head body along a direction substantially parallel to said longitudinal axis.

In accordance with said second embodiment of the extrusion head according to the invention, substantially the same advantages mentioned above with reference to the first embodiment of the extrusion head are achieved.

Nevertheless, in accordance with said second embodiment, the sealing action between the head body and the conveyor element is exerted by the polymeric material on the side of the head body instead of on the side of the conveyor element as in the case of the aforementioned first embodiment.

In accordance with said second embodiment, the aforementioned undercut of the feeding duct of the head body has a length (measured in the axial direction) comprised between about 3 mm and about 30 mm, preferably between about 4 mm and about 12 mm.

Preferably, said undercut is substantially U-shaped. Said particular configuration allows, in fact, to further minimize the risk of formation of stagnation zones of the polymeric material.

Preferably, the bottom wall (in the axial direction) of said undercut is substantially perpendicular to the aforementioned longitudinal axis of the head body.

Preferably, the aforementioned undercut defines an elastically deformable, substantially lip-shaped, sealing element in the upstream portion of the head body.

Preferably, the bottom wall of said undercut is connected to the aforementioned lip by means of a curvilinear part.

Preferably, said curvilinear part has a bending radius comprised between about 0.5 mm and about 1.5 mm.

In accordance with a preferred embodiment, the distribution channel formed in the head body has a development of substantially helical type.

Preferably, said distribution channel is tapered.

Preferably, the undercut of said distribution channel has a decreasing length along the development of the distribution channel. In such a way, the elastically deformable lip defined by the undercut has a greater length and, thanks to this, a greater effectiveness of seal, exactly where the sealing action is most needed, i.e. in correspondence of the feeding duct.

Moreover, according to two further aspects, the present invention refers to a conveyor element and to a head body for an extrusion head for extruding a polymeric material having the features defined, respectively, in claims 22 to 32 and in claims 33 to 39.

Furthermore, the present invention refers to an apparatus for extruding a polymeric material comprising an extrusion head such as the head defined above.

BRIEF DESCRIPTION OF THE DRAWINGS

Further characteristics and advantages of the invention will become clearer from the description of two embodiments of a method for depositing by extrusion a polymeric material according to the invention, made hereafter with reference to the attached drawings in which, for illustrative and not limiting purposes, two extrusion heads for carrying out said method are represented. In the drawings.

DETAILED DESCRIPTION OF THE PREFERRED EMBODIMENTS

Figure 1:
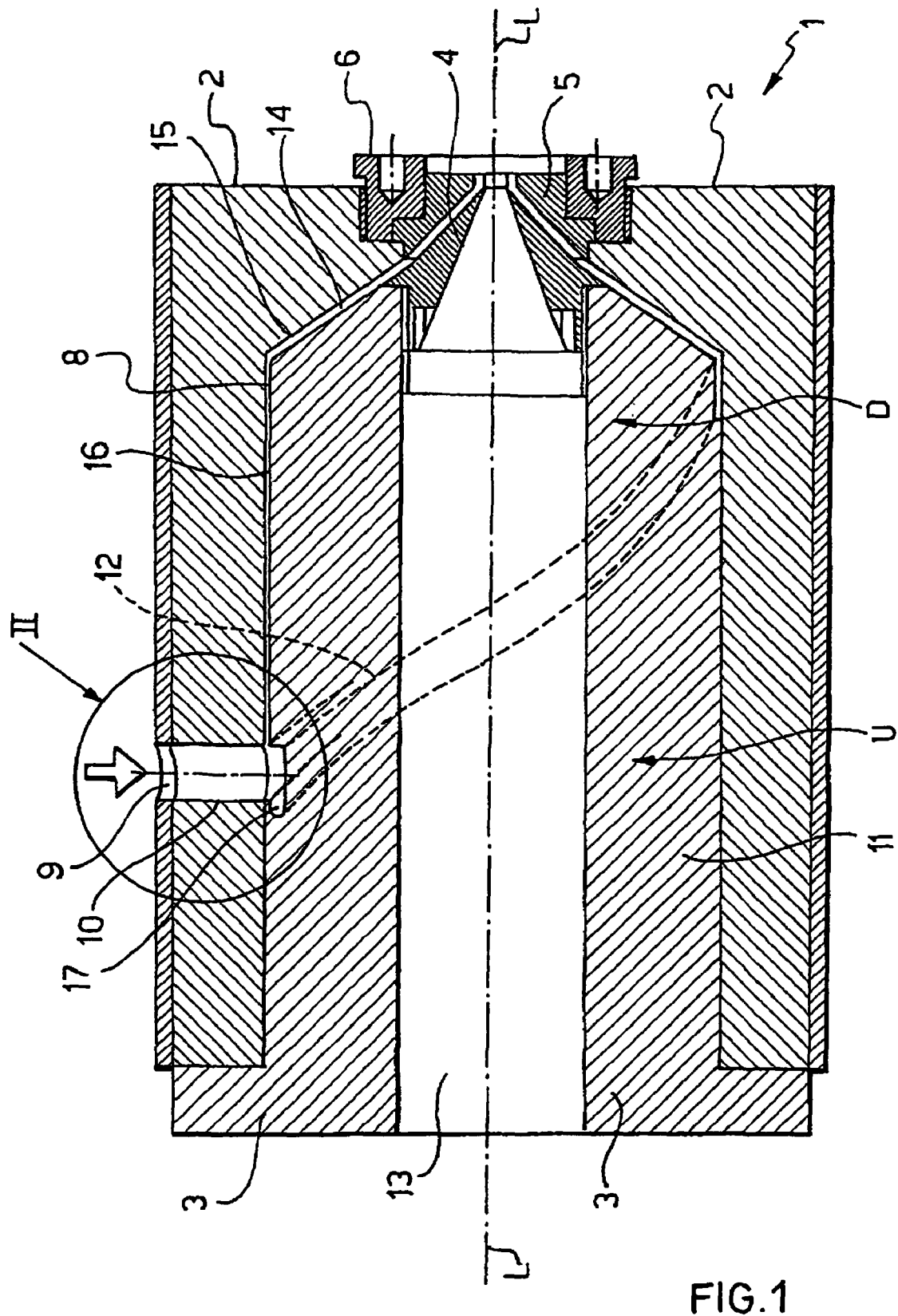
FIG. 1 is a view in longitudinal section of a first preferred embodiment of the extrusion head according to the invention.
Figure 3:
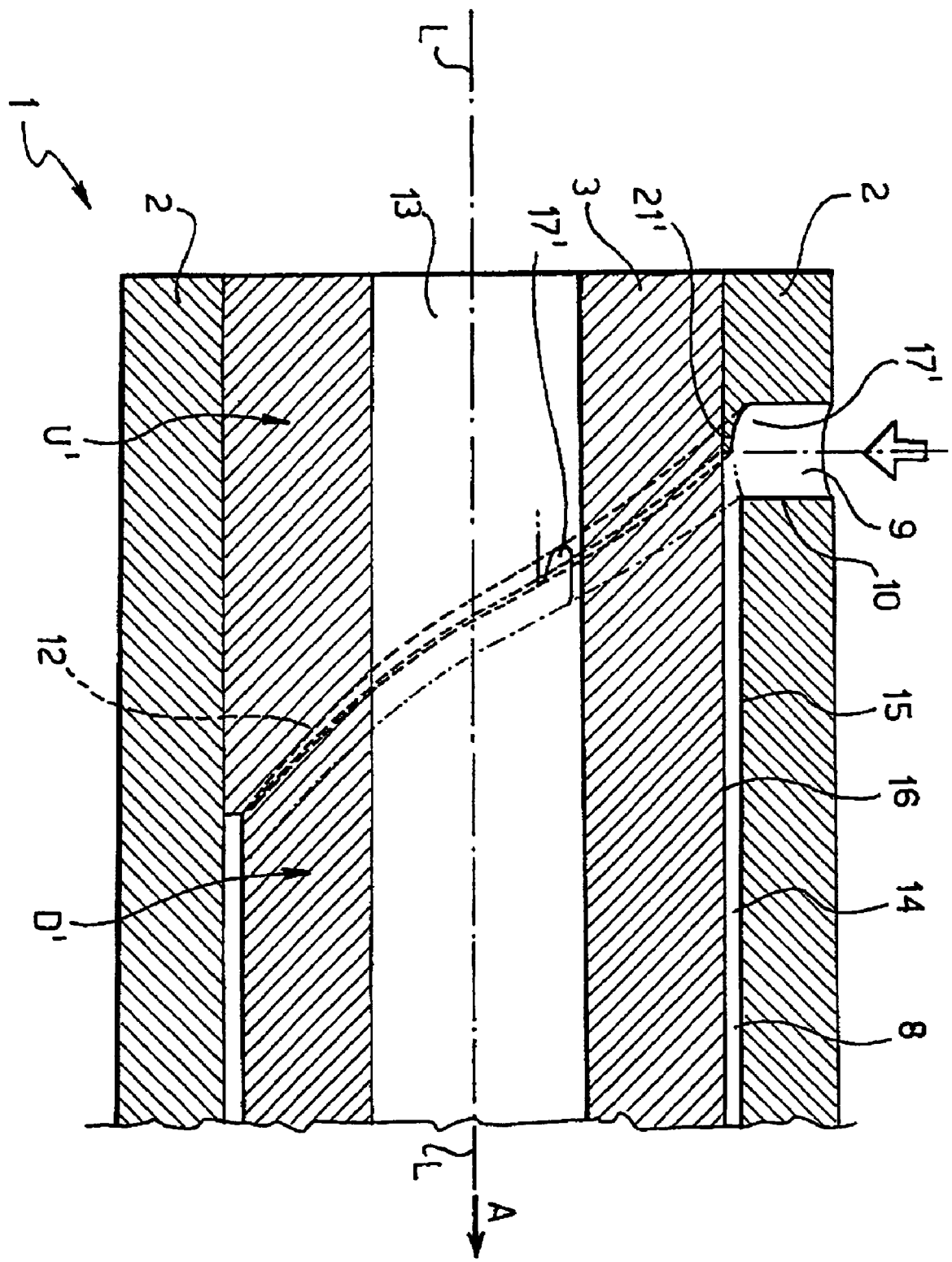
FIG. 3 is a partial view, in longitudinal section, of a second preferred embodiment of the extrusion head according to the invention.

FIG. 1 schematically shows an extrusion head, indicated with reference sign 1, for depositing a coating layer of polymeric material at a radially outer position with respect of a semi-finished product (not shown in the figure) advancing within said extrusion head as indicated by the arrow A of FIG. 3.

It is clear that the man skilled in the art can apply the extrusion head 1 to cables or to articles of a different type by making, if necessary, any suitable modifications.

In the embodiment shown in FIG. 1, the extrusion head 1 comprises a head body 2 having a longitudinal axis L-L, a conveyor element 3, a male die 4 and a female die 5. The male die 4 is fitted upon the conveyor element 3, whereas the female die 5 is fitted upon the head body 2. Said dies are fixed by means of a suitable fixing plate 6.

The head body 2 is provided with an inner cavity 8 coaxially extending with the longitudinal axis L-L and with an inlet duct 9 of the polymeric material, said inlet duct being formed by means of a feeding duct 10 formed in the head body 2 and extending, in the illustrated embodiment, in a direction substantially perpendicular to the axis L-L.

The conveyor element 3, which is mounted in the inner cavity 8 of the head body 2 about the longitudinal axis L-L, comprises a tubular body 11 and a pair of distribution channels 12, only one of which is illustrated by a dashed line in FIG. 1.

The tubular body 11 is provided, similarly to the head body 2, with an inner cavity 13 coaxially extending with the longitudinal axis L-L and intended for receiving the semi-finished product being produced and, as stated above, advancing according to the arrow A.

The extrusion head 1 further includes a lamination channel 14, coaxially defined, downstream of each distribution channel 12, between a radially inner surface 15 of the head body 2 and a radially outer surface 16 of the conveyor element 3.

The end portion of said lamination channel is defined between the male die and the female die mentioned above.

The lamination channel 14 is intended for conveying the polymeric material constituting the desired coating layer onto the outer surface of the semi-finished product being produced. To this purpose, the lamination channel 14 defines a substantially annular and continuous through port which is coaxial with the longitudinal axis L-L of the tubular body 11.

The distribution channels 12 are formed on the outer surface 16 of the tubular body 11 and each channel comprises a first end in fluid communication with the feeding duct 10. In the embodiment illustrated in FIG. 1, the distribution channels 12 have a development of the curvilinear type, substantially of helical type, and extend on radially opposite sides with respect to the axis L-L.

Each distribution channel 12 defines an upstream portion U and a downstream portion D of the tubular body 11.

In particular, each distribution channel 12 carries out the function of distributing the polymeric material entering the extrusion head 1 through the inlet duct 9 as much homogeneously as possible in the downstream portion D of the conveyor element 3.

In such way, said material is uniformly distributed in the lamination channel 14 and allows an optimal production of the desired coating layer.

In a way known per se, for example by means of suitable ducts, not shown, the inlet duct 9 (and, by this, the feeding duct 10, the distribution channels 12 and the lamination channel 14) is in communication with one or more extrusion screws, which are not illustrated since they are conventional per se.

In accordance with said first embodiment of the invention, the distribution channels 12 are provided with an undercut 17 axially extending in the upstream portion U of the tubular body 11 along a direction substantially parallel to the longitudinal axis L-L.

In accordance with the embodiment shown in FIG. 1, the undercut 17, which is substantially U-shaped to minimize undesired phenomena of stagnation of material, has a length of about 6 mm. Said length is suitable for giving an effective seal between the head body 2 and the conveyor element 3 in a pressure range comprised between 0 bar and 700 bar.

Figure 2:
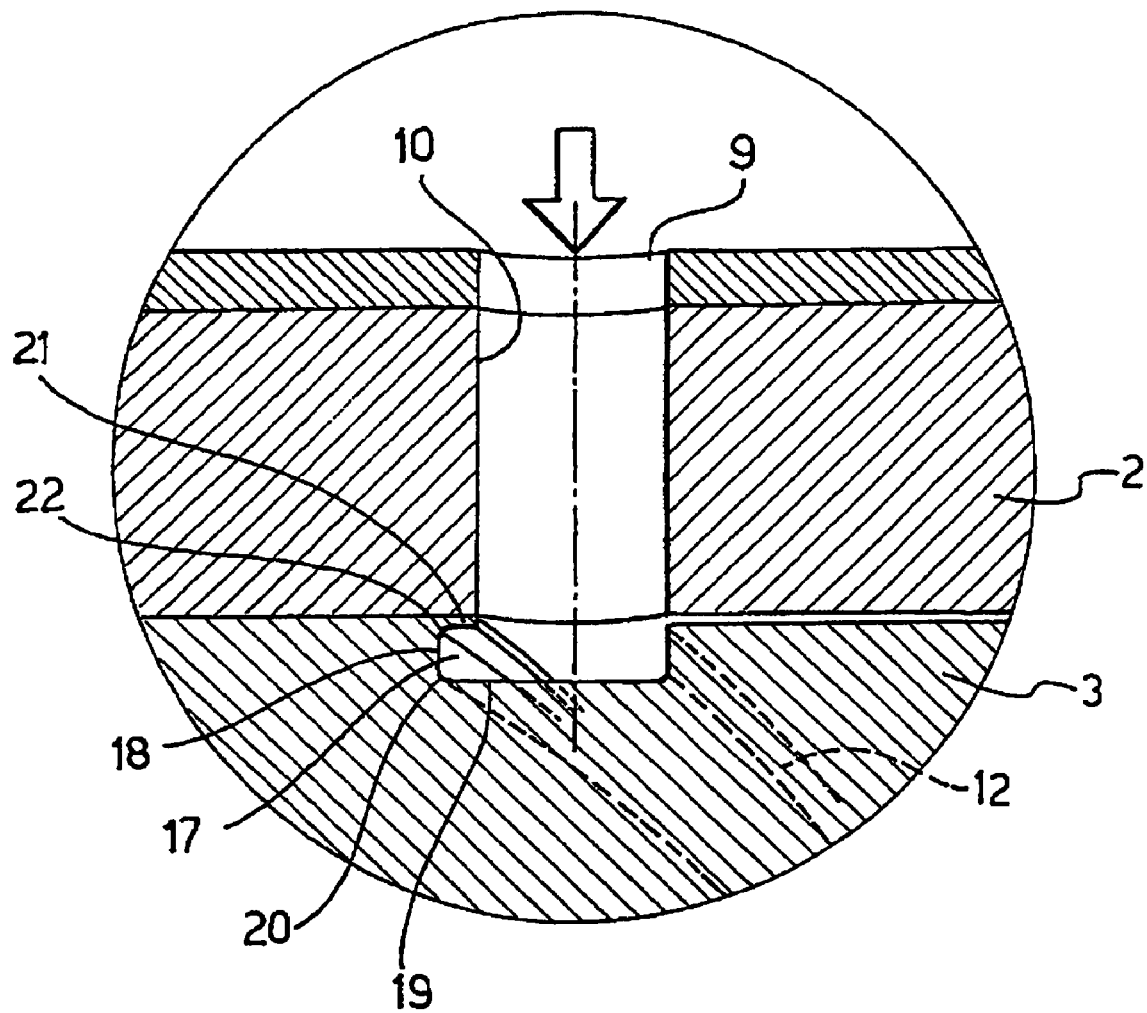
FIG. 2 is an enlarged view of a detail of the extrusion head of FIG. 1.

As shown in greater detail on an enlarged scale in FIG. 2, the undercut 17 comprises a bottom wall 18 which is substantially perpendicular to the longitudinal axis L-L.

In the embodiment shown in FIGS. 1 and 2, the undercut 17 is defined in proximity of the bottom wall 19 of the distribution channel 12.

The bottom wall 18 of the undercut 17 and the bottom wall 19 of the distribution channel 12 are connected by a curvilinear part 20 having a bending radius equal to about 1.5 mm in proximity of the feeding duct.

As illustrated in FIG. 2, the undercut 17 defines an elastically deformable substantially lip-shaped sealing element 21 which is defined in the upstream portion U of the tubular body 11.

The bottom wall 18 of the undercut 17 is connected to said lip 21 by means of a curvilinear part 22 having a bending radius equal to about 1.5 mm in proximity of the feeding duct.

In accordance with the described embodiment, the outer diameter of the conveyor element was equal to 250.07 mm and the inner diameter of the head body was equal to 250.00 mm. In said case, therefore, the interference imparted between said head body and said conveyor element was equal to 0.07 mm.

With reference to the preferred embodiment of the extrusion head described above and illustrated in FIG. 1, the method according to the invention for depositing by extrusion a polymeric material by means of an extrusion head comprises, in a preferred embodiment thereof, the following steps.

After having conveyed the semi-finished product produced up to this point, for example a cable core, obtained in a way known per se, with the longitudinal cavity 13 of the extrusion head 1, in a first step the polymeric material is fed within the feeding duct 10 through the inlet duct 9.

In greater detail, at the same time as said semi-finished product advances (according to the arrow A of FIG. 3), the polymeric composition used for forming the desired coating layer is driven by one or more extrusion screws (known per se and not shown) and is fed through the inlet duct 9 towards the lamination channel 14 thanks to the distribution channels 12.

In a second step of the method of the invention, a part of the polymeric material is conveyed towards the undercut 17 formed in each distribution channel 12.

In said step of the method of the invention, a sealing force is exerted between the head body 2 and the conveyor element 3 by means of the pushing action exerted by the polymeric material in the undercut 17 in a direction substantially perpendicular to the advancing direction A of the semi-finished product within the extrusion head.

In the embodiment illustrated in FIGS. 1 and 2, in which the undercut 17 is formed in the distribution channels 12 of the conveyor element 3, the sealing action is carried out by the polymeric material which exerts a pushing action of the conveyor element 3 against the head body 2, said pushing action being exerted by the elastically deformable lip 21 against the head body 2.

Following the aforementioned steps of the method, the polymeric material, once distributed by the distribution channels 12 on the radially outer surface 16 of the conveyor element 3 and in the lamination channel 14, is conveyed in the zone of the dies on the outer surface of the semi-finished product to produce the desired coating layer.

In FIG. 3 a further embodiment of the extrusion head according to the invention is shown.

The elements of the extrusion head which are structurally or functionally equivalent to those previously illustrated with reference to FIGS. 1 and 2 shall be indicated with the same reference signs and shall not be further described.

In accordance with said embodiment, an undercut 17' is formed in the head body 2, and precisely in the distribution channel 12 formed in the head body 2 (and no longer in the conveyor element 3 as described with reference to the embodiment of FIG. 1).

As illustrated in FIG. 3, the distribution channel 12 defines an upstream portion U' and a downstream portion D' of the head body 2 and the undercut 17' axially extends in the upstream portion U' of the head body 2.

The undercut 17' has a length of about 6 mm and is substantially U-shaped so as to minimize the formation of stagnation zones of the polymeric material.

The undercut 17' defines an elastically deformable substantially lip-shaped sealing element 21' which is defined in the upstream portion U' of the head body 2.

With reference to the aforementioned further embodiment shown in FIG. 3, the method according to the invention comprises the same steps as indicated above with reference to FIG. 1 with the only difference that in such a case the sealing action is carried out by the polymeric material which exerts a pushing action of the head body 2 against the conveyor element 3.

In accordance with further preferred embodiments of the invention, the extrusion head can comprise a second conveyor element coaxially arranged with and at a radially outer position with respect of the first conveyor element. In such a way, it is advantageously possible to simultaneously deposit by co-extrusion a pair of coating layers.

In applications of this type, in which the extrusion head comprises a plurality of conveyor elements, the first embodiment of the extrusion head according to the invention, in other words the embodiment in which the undercut is formed in the distribution channel of the conveyor element, is particularly advantageous. In fact, the presence of an undercut made in this way in each conveyor element allows to accomplish an effective seal both between the head body and the first conveyor element, as illustrated in the aforementioned embodiments, and between the first and the second conveyor element.

As illustrated above, the present invention presents a plurality of advantages which can be achieved.

In particular, the present invention provides a method for depositing by extrusion a polymeric material by means of an extrusion head, which is capable of achieving a seal against leakages of the polymeric material, while ensuring a constructive and assembly simplicity of the extrusion head and of the main components thereof (conveyor element and head body).

In the case in which said method and said extrusion head are applied in cable production processes, said advantages in turn result in the possibility of producing cables of quality, achieving both a reduction in the costs which can be attributed to the extrusion apparatuses used to manufacture the same (in the case in point, the extrusion head) with respect to the extrusion apparatuses of the prior art, and a reduction in the assembly time of said apparatuses.

The invention claimed is:

1. A method for depositing by extrusion a polymeric material by means of an extrusion head comprising a head body and at least one conveyor element coaxially mounted between each other about a common axis, said head body comprising at least one feeding duct disposed through a radially inner surface of said head body and a radially outer surface of said head body and extending in a direction substantially perpendicular to a longitudinal axis of an inner cavity of said head body, said feeding duct adapted for feeding said polymeric material in a lamination channel defined between said head body and said conveyor element, said method comprising
   a) feeding said polymeric material in said feeding duct; and
   b) conveying a part of said polymeric material towards at least one undercut arranged in proximity of an end of said feeding duct, said at least one undercut defining an elastically deformable sealing-element formed on one of the inner surface of said head body and the outer surface of said conveyor element, the sealing-element being lip-shaped and extending in a direction substantially parallel to said longitudinal axis, said part of said polymeric material exerting a sealing action between said head body and said at least one conveyor element by pushing on the sealing-element.

2. The method according to claim 1, wherein said sealing action of said part of said polymeric material is carried out by pushing on the sealing-element in a direction substantially perpendicular to said common axis.

3. The method according to claim 1, wherein said undercut is formed in at least one distribution channel formed on the outer surface of said conveyor element, and wherein said sealing action is exerted by pushing said conveyor element against said head body.

4. The method according to claim 3, wherein said sealing action is carried out by pushing an elastically deformable sealing element which is integrally formed with said conveyor element and which extends in a direction substantially parallel to said common axis.

5. The method according to claim 1, wherein said undercut is formed in at least one distribution channel formed on the inner surface of said head body and wherein said sealing action is carried out by pushing said head body against said conveyor element.

6. The method according to claim 5, wherein said sealing action is carried out by pushing an elastically deformable sealing element which is integrally formed with said head body and which extends in a direction substantially parallel to said common axis.

* * * * *